US006967735B2

(12) United States Patent
Catt et al.

(10) Patent No.: US 6,967,735 B2
(45) Date of Patent: Nov. 22, 2005

(54) ENHANCED NETWORKED PRE-PRESS IMAGING

(75) Inventors: Jeremy C. Catt, North Andover, MA (US); Thomas P. Brady, Methuen, MA (US); Frank P. White, Woburn, MA (US)

(73) Assignee: Agfa Corporation, Wilmington, MA (US)

( * ) Notice: Subject to any disclaimer, the term of this patent is extended or adjusted under 35 U.S.C. 154(b) by 901 days.

(21) Appl. No.: 09/827,315

(22) Filed: Apr. 6, 2001

(65) Prior Publication Data

US 2002/0145749 A1 Oct. 10, 2002

(51) Int. Cl.[7] .......................... G06F 15/00; G06F 15/16
(52) U.S. Cl. ...................................... 358/1.15; 709/246
(58) Field of Search ............................... 358/1.15, 406; 709/246, 238

(56) References Cited

U.S. PATENT DOCUMENTS 6,175,428 B1 * 1/2001 On et al. .................... 358/406
6,415,331 B1 * 7/2002 Ariga ......................... 709/246
6,466,328 B1 * 10/2002 Bradley et al. ............. 358/1.15

OTHER PUBLICATIONS

WO 96/01449 by Danny Vatland et al., published on Jan. 18, 1996.

* cited by examiner

Primary Examiner—Kimberly Williams
Assistant Examiner—Saeid Ebrahimi Dehkordy
(74) Attorney, Agent, or Firm—Alfred A. Stadnicki; Robert A. Sabourin

(57) ABSTRACT

An imaging system includes image processors, storage devices, one or more print drivers, and one or more image makers. The image processors generate image data representing an image. The storage devices store the image data. The print driver(s) generate instructions corresponding to the image data. The image maker(s) generate a representation of the image in accordance with the instructions. A first communications network interconnects the image processors and the print driver(s). A second communications network interconnects the image processors, the print driver(s), and the storage devices.

16 Claims, 3 Drawing Sheets

ENHANCED NETWORKED PRE-PRESS IMAGING

TECHNICAL FIELD

The present application generally relates to pre-press imaging and more particularly to enhanced networked pre-press imaging capable of accommodating multiple raster image processor and/or print drivers.

BACKGROUND ART

As shown in FIG. 1, a conventional pre-press imaging system 100 commonly includes a raster image processor (RIP) 105, or other type image processor, a print drive server (PDS) 110, and one or more image maker (IM), such as a pre-press image setter (PPIS) 115 having an optical scan assembly, e.g. a laser scanner, and a support surface, e.g. a cylindrical drum and/or an image proofer (IP) 120, e.g. a color proofing device.

In operation, the RIP 105 receives, as input, a digitized image from a front-end processor (not shown) or via a user commands entered on a user input device (not shown), and processes the received input to generate raster image data representing the input image. The raster image data is transmitted from the RIP 105 to the PDS 110, and subsequently processed by the PDS 110 to generate appropriate instructions for the applicable IM 115 or 120. These instructions are transmitted from the PDS 110 to the IM 115 or 120.

For example, if an IP 120 is included as part of the system, the instructions for the IP 120 may be transmitted by the PDS 110 to the IP 120 prior to instructions being transmitted by the PDS 110 to the PPIS 115. The IP 120 operates in accordance with the received PDS instructions to generate an image proof, e.g. a color proof, for inspection by a system operator, as is well understood in the art. If the proof is deemed acceptable, PDS instructions for the PPIS 115 are transmitted to the PPIS 115. In accordance with these received instructions, the optical scan assembly of the PPIS 115 operates to scan the image represented by the PDS instructions onto a plate or film supported by the support surface of the PPIS 115. In this way, the input image is transferred to the plate or film, which in turn can be used to print the input image on other media, e.g. paper.

More recently, enhancements in print drive server capabilities, and particularly the introduction of the AGFA™ Apogee™ print drive server, have allowed multiple RIP to be serviced by one or more PDS. FIG. 2, depicts a convention networked imaging system 200 with an Ethernet network 225 linking multiple RIPs 205 to a single PDS 210. It will be recognized that additional PDS could also be linked to the multiple RIPs 205 via the network 225 if so desired. The RIPs 205 and PDS 210 are typically configured on separate workstations, and communicate via the network 225. However, if desired, a single workstation could serve as both the PDS 210 and one of the RIPs 205.

In operation, each of the networked system RIPs 205 processes received input to generate raster image data. The applicable RIP 205 then typically transmits this data via the network 225 to a remote storage device 230, i.e. typically a storage device remote to both the applicable RIP 205 and the PDS 210, but accessible to both the applicable RIP 205 and PDS 210 via the network 225. The transmitted raster image data is written into a storage file of the remote storage device 230. The remote storage device 230 could, for example, be a magnetic or optical disk or some other type storage device.

The stored data is retrieved, typically via the network 225, by the PDS 210 from the remote storage device 230 by reading the applicable storage file when needed. The read raster image data is transmitted to the PDS 210 via the network 225, and processed to generate instructions for the applicable IM 215 and/or 220. These instructions are in turn transmitted to the applicable IM 215 and/or 220, either via a dedicated link 227 in the case of the PPIS 215, or via the network 225 in the case of the IP 220.

However, in the case where the RIP 205 and PDS 210 are implemented in a single workstation, the raster image data generated by that RIP 205 will typically be stored in a local storage device (not shown). In such a case, there is no need to transmit the raster image data via the network 225. Furthermore, even in the case where the RIP 205 and PDS 210 are implemented on separate workstations, the raster image data generated by that RIP 205 may be stored in a storage device local to the applicable RIP 205 or the PDS 210. In the case where the storage device is local to the RIP 205, there will be no need for the RIP 205 to transmit the raster image data via the network 225 to the storage device 230. In the case where the storage device is local to the PDS 210, there will be no need for the PDS 210 to retrieve the stored raster image data via the network 225 from the storage device 230. Hence, in either of these later cases only a single transmission of the raster image data over the network 225 is required.

When a job begins, the RIP 205 requests a destination storage device and path from the PDS 210. If the RIP 205 and PDS 210 are implemented on same workstation, the destination storage device will normally be a local storage device and the raster image data is simply written as a file to local storage. If not, the destination drive and path request is communicated via a network 225.

If the PDS 210 destination storage device letter designation e.g. "drive C" provided to the RIP 205 in response to the request is to a remote, mapped storage device 230, the RIP 205 will transmit the raster image data over the network 225 and the data will be written directly to storage at the designated storage device 230 via remote file access by the RIP 205.

On the other hand, if the PDS 210 destination storage device letter designation is to a remote, at least with respect to the RIP 205, unmapped device, e.g. a storage device local to the PDS 210, the RIP 205 will transmit the raster image data over the network 225 to the PDS 210. The PDS 210 will then transmit the raster image data over the network 225 and the data will be written to storage at the designated storage device via remote file access by the PDS 210.

If the PDS 210 destination storage device letter designation is not to a remote storage device, but rather to a storage device which is local to the RIP 205, the raster image data is simply written as a file to local storage.

In all of the above cases, the RIP 205 informs the PDS 210 that the image data has been written once storage has been completed.

Pseudo code for the above is as follows:
1) RIP→PDS: Query, where should data be written?*
2) PDS→RIP: Response, X:\path\ . . . \filename*
3) RIP Processing
   a) if RIP and PDS are on different workstations (i) and if X is a remote, mapped drive write image data via remote file system*,(ii) and else write image data via PDS interface*
   b) else write image data to local drive
4) RIP→PDS: Data has been written*
   where *=Ethernet transmission The electronic pre-press workflow involves the generation of large amounts of raster image data by the RIPs 205 and the consumption of this data by an IMs, e.g. the PPIS 215 and the IP 220. As discussed above, often the RIP 205 stores the raster image data at and the PDS 210 retrieves the stored raster image data from a remote storage device 230. In such cases multiple transmissions of the raster image data via the network 225 are required, i.e. transmissions to and from the applicable storage device 230.

Furthermore, on occasion the RIP 205 may store the raster image data at and the PDS 210 may retrieve the stored raster image data from a storage device which is local to either the applicable RIP 205 or the PDS 210, but not to both. In such cases, at least one transmission of the raster image data via the network 225 is still required, i.e. transmissions to or from the applicable storage device.

Although conventional networked imaging systems developed since the introduction of AGFA™ Apogee™ print drive server are a vast improvement over imaging systems developed prior to the introduction of the AGFA™ Apogee™ print drive server, conventional networked imaging systems, such as that depicted in FIG. 2, have experienced certain problems which has been difficult to overcome.

More particularly, because of the large amounts of raster image data which must be communicated via these networks, the transmission(s) of this data over the network 225 can significantly degrade the overall performance of the network 225. The uncompressed image data for a normal four color job can exceed 10 Gigabytes. Data compression and decompression help to reduce the amount of data which must be transmitted and stored, but even in compressed form the raster image data can be quite large, e.g. more than 1 Gigabyte per job.

If a large amount of network bandwidth is allocated to each such transmission, this may result in delays in the transmission of other data, including other raster image data over the network, or in the inability to transmit other data altogether during the transmission of the raster image data, due to inadequate total bandwidth capacity of a given network link.

Further still, in some networks even if the maximum possible bandwidth is allocated to the transmission of raster image data, the transmission of the raster image data may still be unduly slow, and also delay or prevent other transmissions over the network for a relatively lengthy period of time. For example, the transfer of image data for a job, using 100 Megabits/second 100 Base-T, can consume the entire network bandwidth for up to two minutes.

Another problem arises in the amount of memory needed to store the raster image data. In order to store jobs, for example at 1 Gigabyte per job, the network storage device(s) must have large capacity, high access speed, and easily expandable memory resources.

Therefore a need exists for an improved technique for networking multiple RIPs, one or more PDSs and one or more storage devices which are remote to either the RIPs, or the PDS(s), or both.

OBJECTIVES OF THE INVENTION

Accordingly, it is an object of the present invention to provide an improved technique for networking multiple RIPs, with one or more PDSs and one or more storage devices which are remote to either the RIPs, or the PDS(s), or both, such that the aforementioned problems of conventional networked pre-press imaging systems can be mitigated or completely avoided.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the invention, an imaging system includes an image processor, preferably a raster image processor, a storage device, which preferably is part of a single pool of storage devices and may be of any type, a print driver, such as a print drive server and an image maker, preferably a color proofer or an image setter, such as a cylindrical drum imager. The image processor is configured to generate image data, e.g. raster image data, representing an image. The storage device is configured to store the image data. The print driver is configured to generate instructions corresponding to the image data. The image maker is configured to generate a representation of the image in accordance with the instructions.

The system also includes two communications networks. A first communications network, such as an Ethernet network having links with a particular bandwidth capacity, interconnects the image processor and the print driver. A second communications network, such as a broadband network, interconnects the image processor, the print driver, and the storage device. Advantageously, the second network includes a respective dedicated link between the image processor and the storage device, and between the print driver and the storage device. Each of these dedicated links preferably has a bandwidth capacity greater than the bandwidth capacity of the individual Ethernet network links.

According to a preferred aspect of the invention, the image processor is further configured to write the generated image data to the storage device via the second communications network, and the print driver is further configured to read the stored image data from the storage device via the second communications network.

Beneficially, the image processor is further configured to generate a message indicative of the image data having been written to the storage device and to transmit this to the print driver via the first communications network.

In accordance with other preferred aspects of the invention, the print driver may be further configured to transmit a product identifier to the image processor via the first communications network. The product identifier identifies the destination storage device at which the image data generated by the image processor is to be stored. The image processor is further configured to process the transmitted product identifier to determine if the destination storage device at which the generated image data is to be stored is the above described device, or pool of storage devices. If so, the image data generated by the image processor is written to the storage device or pool of storage devices via the second communications network.

According to other preferred aspects of the invention, the print driver may be further configured to also transmit a destination identifier for a destination storage device to the image processor, via the first communications network. The destination storage device destination identifier identifies the destination of the destination storage device at which the image data generated by that image processor is to be stored. The image processor is also further configured to transmit to the print driver, responsive to the transmitted destination storage device destination identifier and via the first communications network, a request for the previously described product identifier for the destination storage device at the identified destination. The print driver is additionally configured to transmit the product identifier for the destination storage device at the identified destination responsive to the request transmitted by the image processor.

It may be desirable, in certain implementations, for the system to also include a remote storage device which is configured to store the image data. In such implementations, the first communications network may be further configured to interconnect the image processor, the print driver and the remote storage device. The image processor is beneficially further configured to process the transmitted product identifier to determine if the destination storage device at which the generated image data is to be stored is the remote storage device. If so, the image data generated by the image processor is written to that remote storage device.

If the remote storage device is included in the system, the image processor is further beneficially configured to transmit a request for the product identifier for the destination storage device at the identified destination, to the print driver. This request is preferably transmitted responsive to the transmitted destination storage device destination identifier and via the first communications network. The print driver is further configured to transmit the product identifier for the destination storage device at the identified destination responsive to the transmitted request.

According to still other aspects of the invention, the transmitted destination storage device destination identifier includes a storage device designation for the destination storage device at the identified destination associated with the print driver. The designation could, for example, take a form similar to "drive G". The image processor is further configured to determine if the destination storage device designation associated with the print driver corresponds to a storage device designation for the remote storage device associated with the image processor. This determination is preferably made by attempting to map the destination storage device designation associated with the print driver with a storage device designation associated with the image processor for the remote storage device.

If a positive determination is made, the image data generated by the image processor is written by the image processor directly to the remote storage device via the first communications network. For example, the image processor may determine that the "drive G" designation used by the print driver to access the remote storage device corresponds to the "drive E" designation used by the image processor to access the same storage device. Hence, the image processor is able to directly store the image data at the remote storage device using the "drive E" designation and the print driver is able to directly retrieve the stored image data from remote storage device using the "drive G" designation.

If not, the image data generated by the image processor is transmitted by the image processor to the print driver via the second communications network. The print driver then writes the image data to the applicable remote storage device. For example, in this case, the image processor may determine that the "drive G" designation used by the print driver to access the remote storage device does not correspond to any drive designation used by the image processor to access a storage device. Hence, the image processor is unable to directly store the image data at applicable storage device using one of its drive designations. Therefore, the image processor transmits the image data to the print driver. The print driver then directly stores the transmitted image data at the applicable storage device, for example using its "drive G" designation, and can directly retrieve the stored image data from applicable storage device using the "drive G" designation drive.

Thus, according to the invention, image data, preferably raster image data, representing an image, typically a color image, is generated. The generated image data is written to a storage device via one communications network, such as a broadband network. A notice of the generated image data having been written to the storage device is transmitted via another communications network, such as an Ethernet network. The stored image data is read from the storage device via the one communications network, typically subsequent to transmission of the notice. Imaging instructions corresponding to the read image data are generated, and a representation of the image, such as a color proof of the image or the image itself, is generated in accordance with the instructions.

Preferably, the generated raster image data is written to the storage device via a first dedicated communications link within the one communications network. The stored raster image data is then read from the storage device via a second dedicated communications link within the one communications network. Advantageously, the dedicated links have a bandwidth which is greater than the bandwidth of individual links within the other communications network.

Beneficially a product identifier for the destination storage device at which the image data is to be stored is transmitted via the other communications network. This product identifier is processed to determine if the destination storage device is located on the one communications network. If so, the generated image data is written to the storage device via the one communications network.

Advantageously, a destination identifier for the destination storage device at which the generated image data is to be stored is also transmitted via the other communications network. Responsive thereto, a request for the product identifier for the destination storage device is transmitted via the one communications network, and the product identifier is transmitted responsive to this request.

Other image data representing an image may also be generated.

If so, a product identifier for a destination storage device at which the other generated image data is to be stored is transmitted via the other communications network. The transmitted product identifier is processed to determine if the destination storage device, i.e. the one identified by the product identifier, is remote to the one communications network. If it is, the other generated image data may be written to a remote storage device identified by the product identifier via the second communications network.

Beneficially, the transmitted destination storage device destination identifier includes a storage device designation for the storage device at the identified destination. If so, a determination is preferably made as to whether that storage device designation corresponds to another storage device designation for the remote storage device. If it does, the other generated image data is written directly to the remote storage device via the other communications network. However, if it does not correspond, the other generated image data is transmitted to a network device other than the remote storage device at the identified destination via the one communications network. The image data is then written by that network device to the remote storage device at the identified destination.

BEST MODE FOR CARRYING OUT THE INVENTION

Figure 1:
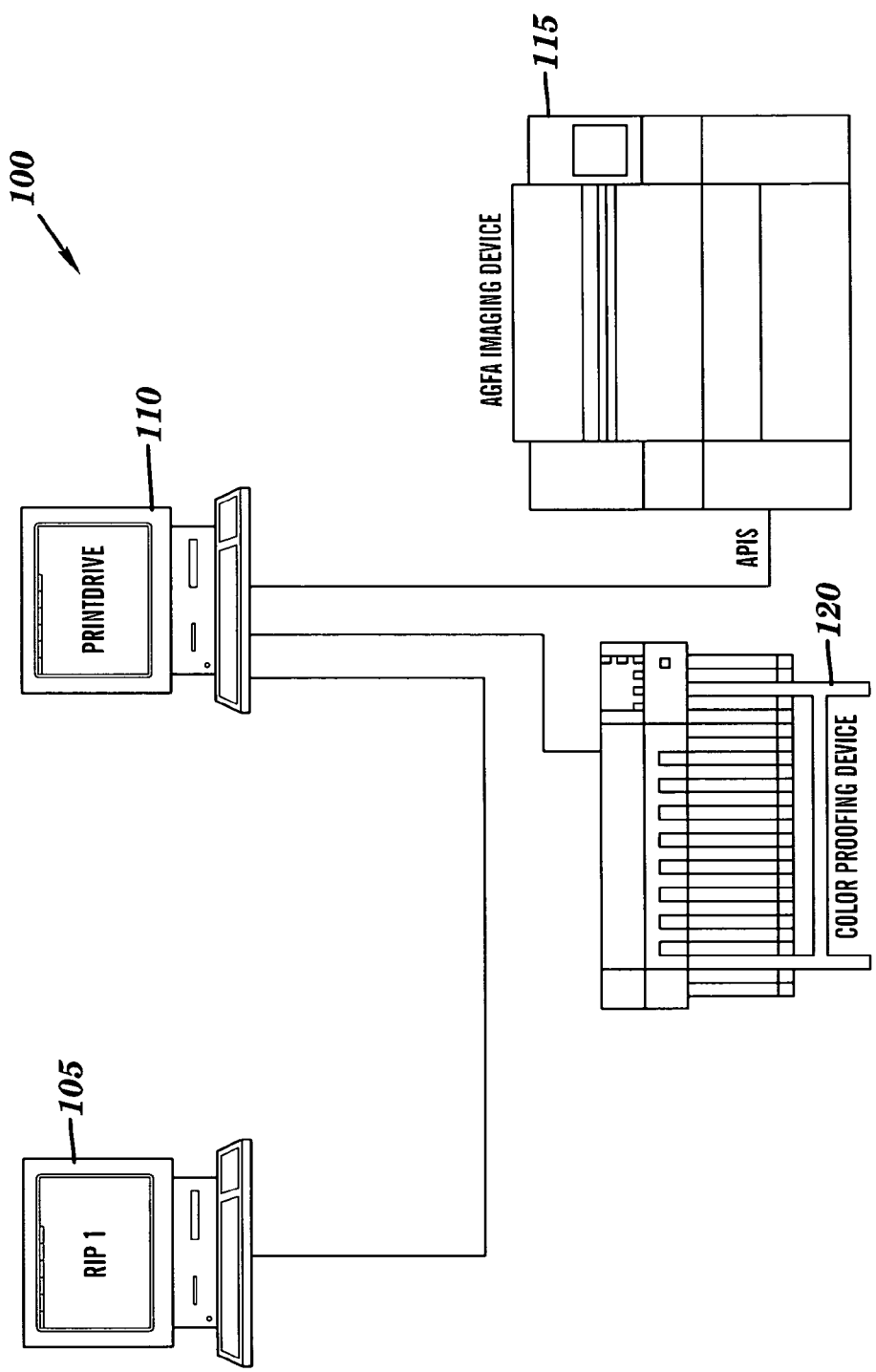
FIG. 1 depicts a conventional pre-press imaging system.
Figure 2:
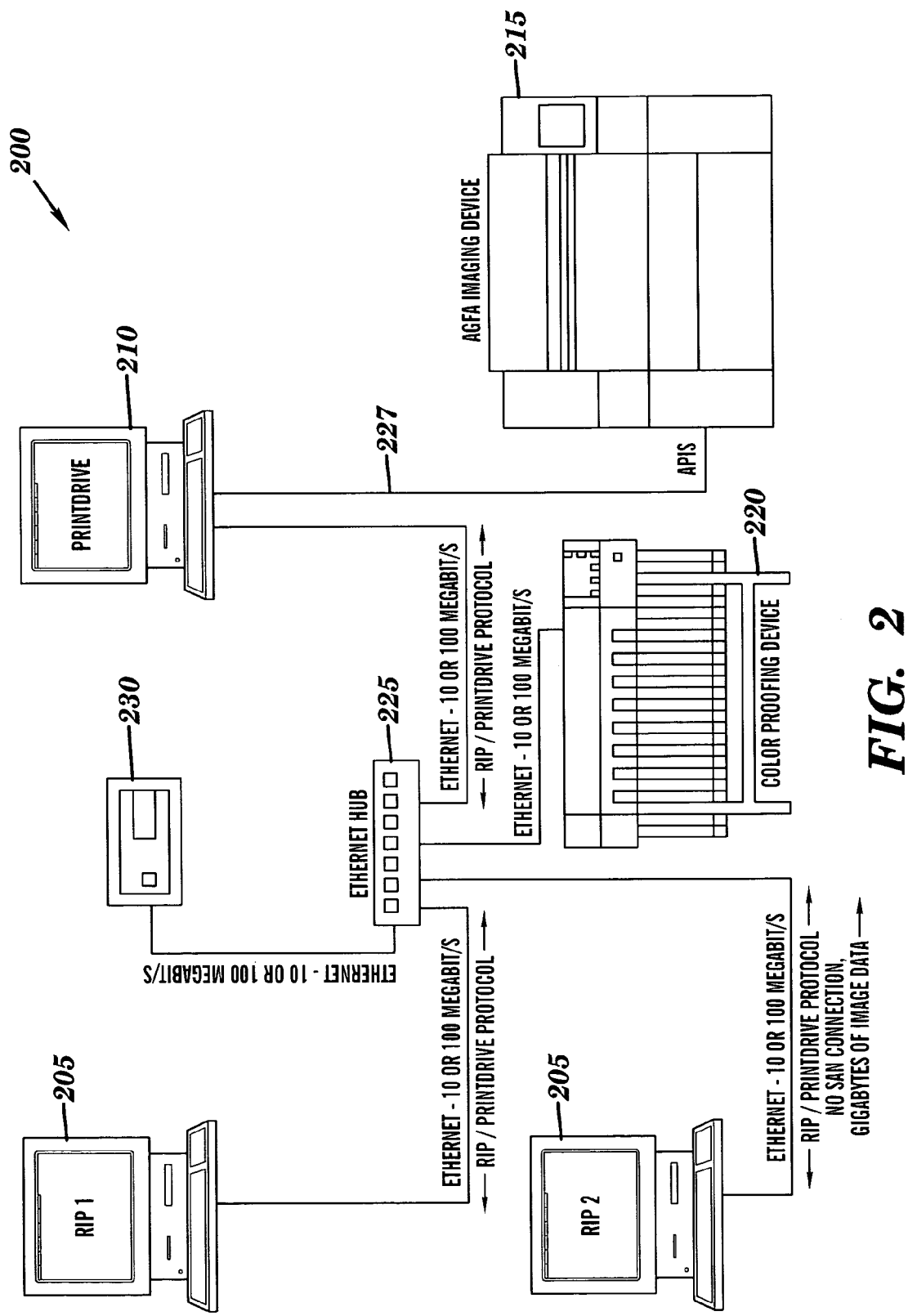
FIG. 2 depicts a conventional networked pre-press imaging system.
Figure 3:
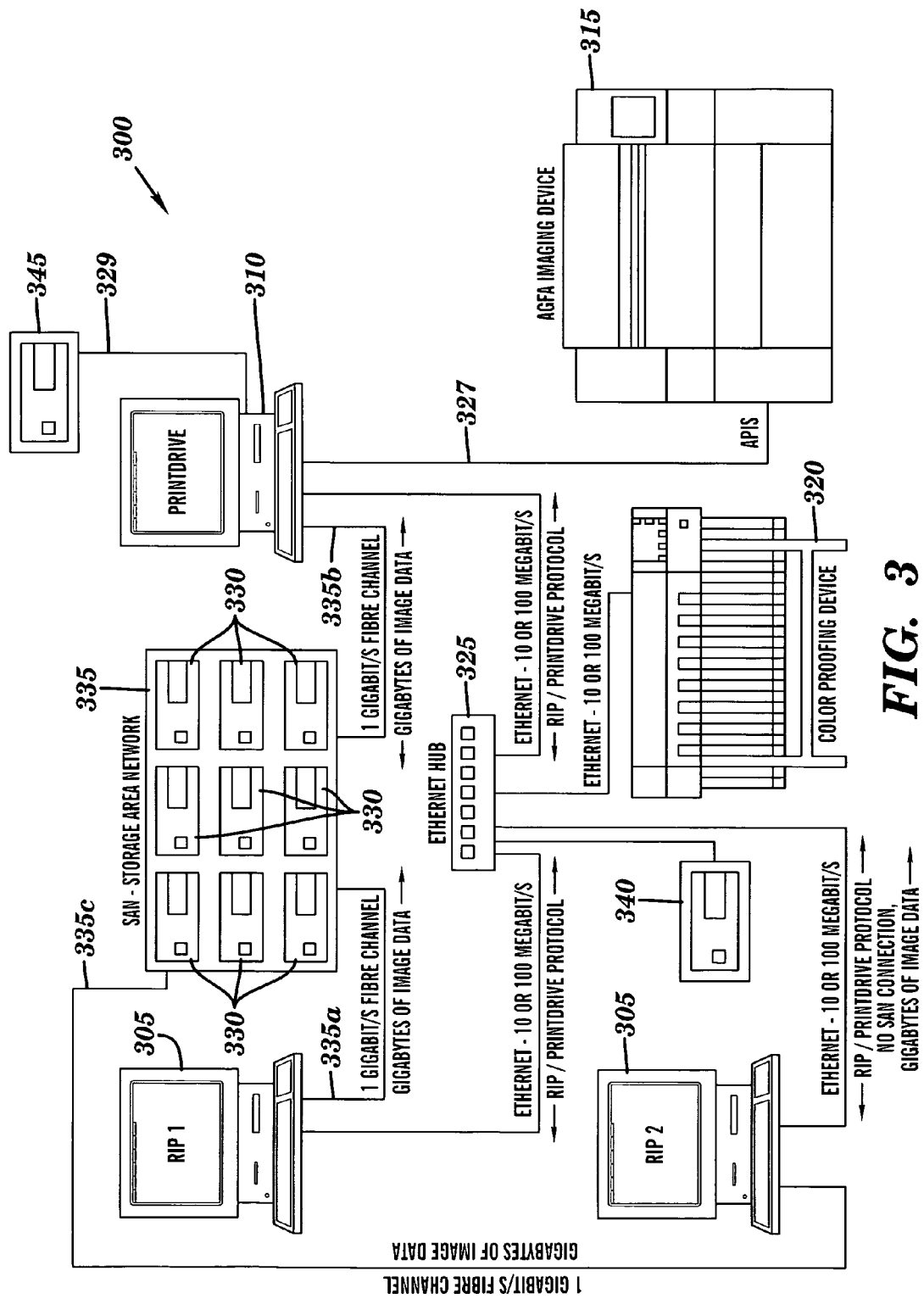
FIG. 3 depicts an enhanced networked pre-press imaging system in accordance with the present invention.

FIG. 3 depicts an enhanced networked pre-press imaging system 300 in accordance with the present invention.

As shown, the networked system 300 includes multiple raster image processors (RIPs) 305, a print drive server (PDS) 310, and multiple image makers (IMs) 315 and 320. The IMs include a pre-press image setter (PPIS) 315 having an optical scan assembly, such as a laser scanner, and a support surface, such as a cylindrical drum, and an image proofer (IP) 320 which could, for example, be a color proofing device. A single workstation could serve as both the PDS 310 and one of the RIPs 305, although generally each RIP 305 and each PDS 310 will be implemented on a separate workstation. Also included are multiple remote SAN storage devices 330 and non-SAN storage devices 340 and 345, i.e. storage devices remote to both the RIPs 305 and the PDS 310, for storing raster image data generated by the RIPs 305. It will be recognized that the invention is easily adaptable to accommodate storage devices local to the applicable RIP 305 or PDS 310, or local to both the applicable RIP 305 and the PDS 310 which could be the case if the PDS 310 and applicable RIP 305 are implemented as a single workstation.

An Ethernet network 325, preferably formed of optical fiber or high-speed copper cable, interconnects the RIPs 305, PDS 310, storage device 340 and IP 320, thus providing links between each of the multiple RIPs 305 and the PDS 310 and the storage device 340, and between the PDS 310 and the IP 320. The PDS 310 is connected to the PPIS 315 via a dedicated link 327. The PDS 310 is connected to the remote storage device 345 by a separate link or network 329. Additional PDSs 310 could also be interconnected to the multiple RIPs 305, and to the IP or other IPs via the Ethernet network, if so desired.

A storage area network (SAN) 335, preferably also formed of optical fiber or high-speed copper cable, interconnects the remote storage devices 330 with each of the RIPs 305 and the PDS 310, thus providing a respective dedicated link 335a or 335b between the remote SAN storage devices 330 and each of the multiple RIPs 305 and between the remote SAN storage devices 330 and the PDS 310. Accordingly, the networked pre-press imaging system 300 of FIG. 3 includes what may be characterized as overlapping Ethernet and storage area networks 325 and 335.

Preferably, the dedicated links 335a and 335b provided by the SAN 335 are very high speed, e.g. 100 Megabyte per second, connections. Advantageously, each of the multiple remote SAN storage devices 330 includes a fast, large memory, as are well known in the art. The multiple remote SAN storage devices 330 are configured in a pool of storage devices 330, as depicted in FIG. 3, which is easily expandable by adding additional remote SAN storage devices to the SAN storage device pool.

In operation, each of the networked system RIPs 305 receives, as input, a digitized image from a respective or shared front-end processor (not shown) or via user commands entered on a user input device (not shown). The applicable RIP 305 processes the received input to generate raster image data representing the input image. The raster image data may be directly transmitted from the applicable RIP 305 via the SAN 335 to the SAN's multiple storage devices 330 via the dedicated SAN link 335a between the applicable RIP 305 and SAN storage devices 330.

The raster image data stored on the SAN storage devices 330 is retrieved by the PDS 310 directly from the SAN storage devices 330, via the dedicated SAN link 335b between the PDS 310 and storage devices 330. The PDS 310 processes the retrieved raster image data to generate appropriate instructions to the applicable IM 315 or 320. These instructions are transmitted from the PDS 310 to the IM 315 or 320 via either the Ethernet network 325 or a dedicated non-network link 327.

More particularly, if the PDS 310 instructions are generated for the IP 320, the instructions are transmitted via the Ethernet network 325. On the other hand, if the PDS 310 instructions are generated for the PPIS 315, the instructions are transmitted via the dedicated non-network link 327.

Beneficially, the PDS 310 instructions for the IP 320 are transmitted to the IP 320 prior to PDS 310 instructions being transmitted to the PPIS 315. The IP 320 operates in accordance with the received PDS 310 instructions to generate an image proof, e.g. a color proof, for inspection by a system operator, as is well understood in the art.

If the proof is determined to be acceptable, the PDS 310 instructions for the PPIS 315 are transmitted via the dedicated non-network link 327 from the PDS 310 to the PPIS 315. In accordance with these received instructions, the optical scan assembly of the PPIS 315 operates to scan the image represented by the PDS 310 instructions onto a plate or film supported by the support surface of the PPIS 315. The image input to the RIP 305 is thereby transferred to the plate or film. The film or plate can in turn be used to print the input image on other media, e.g. paper.

Thus, the use of the SAN 335 solves problems relating to network bandwidth and storage capacity in convention networked pre-press systems. However, in order for the PDS 310 to retrieve raster image data from the SAN and other remote storage devices, each RIP 305 and the PDS 310 must somehow coordinate on the identity of the applicable storage device address. Thus, the use of the SAN 335 introduces a question as to how to identify the remote storage device at which particular raster image data should be stored.

This question is answered by adding a volume serial number query and response to the PDS protocol. More particularly, the PDS 310 is configured to transmit an applicable destination storage device identifier and path to each of the RIPs 305. Each of the RIPs 305 is configured to query PDS 310 for the identified storage device's volume serial number, after receipt of the destination and path information from the PDS 310. Each RIP 305 is further configured to process the storage device volume serial number returned by the PDS 310 in response to the query to determine if one of the volume serial numbers of the storage devices accessible to that RIP 305 matches the storage device volume serial number returned by the PDS 310. If so, the destination storage device is deemed to be a shared storage device, e.g. a SAN storage device 330 or remote non-SAN storage device 340.

However, even after the RIP 305 has confirmed that the destination device designated by the PDS 310 is an accessible shared storage device, a further question remains. More particularly, since there is no established storage device identifier standard, one RIP 305 could, for example, identify a remote storage device as "Drive G", while another RIP 305 might identify the same remote storage device as "Drive Z". Further, the PDS 310 might identify the same remote storage device as "Drive D". Hence, the PDS 310 could seek to retrieve raster image data at address D:/xxx or D:/yyy which has been stored by one RIP 305 at address G:/xxx or by another RIP 305 by at address Z:/yyy. Thus, a question remains as to how the RIP's 305 and PDS 310 will share access to the remote storage devices, including devices 330, such that the PDS 310 can easily access the appropriate raster image data stored by the RIPs 305 on the shared remote storage devices 330 and 340.

This potential problem is solved by mapping the PDS's 310 storage device address to applicable RIP's 305 storage device address. More particularly, the PDS 310 is configured to retrieve the volume serial numbers, by stepping the drive designation for the destination device string from, for example, "C" to "Z". Drive designations "A" and "B" are assumed to be local drives, and are therefore not checked. The string is processed as an argument to a call, for example for "GetVolumeInformation(path, . . . )". If the destination volume's serial number matches that returned from GetVolumeInformation, the drive letter string is captured for subsequent use.

In certain operating systems, such as Windows™, call "GetLogicalDrives( )," provides a mask of assigned drive designation letters, and only assigned drive designation letters are checked. Further, in Windows™ call, "GetDriveType(path)," the device assigned to the drive designation letter in the path is described, and only drives with a "DRIVE_FIXED" type are checked.

Referring again to FIG. 3, when a job begins, the RIP 305 requests a destination drive designation and path from the PDS 310. If the RIP 305 and PDS 310 reside on same workstation, the image data is written to the local drive as a file.

If not, the RIP 305 queries the PDS 310, via a communication over the Ethernet network 325, for the destination storage device's volume serial number. The PDS 310 processes the query and transmits the destination storage device's volume serial number to the RIP 305 via the Ethernet network 325.

The RIP 305 receives the destination storage device's volume serial number from the PDS 310, and processes the received serial number, typically by comparing it to those destination storage device volume serial numbers accessible to that RIP 305. Typically, these destination storage device volume serial numbers are stored locally at the applicable RIP 305. If the destination storage device's volume serial number received from the PDS 310 is determined to correspond to a storage device accessible to the RIP 305, e.g. determined by matching the received destination storage device's volume serial number and one of the stored accessible storage device's volume serial numbers, the destination storage device identified by the PDS 310 is deemed by the RIP 305 to be a shared storage device. The RIP 305 drive designation for that device is mapped to the PDS designation for that same device.

If the identified destination storage device identified by the PDS 310 is further deemed to be a SAN storage device 330, the RIP 305 will transmit the raster image data to the identified SAN storage device 330 via the SAN 335. The transmitted raster image data is written as a file in the SAN storage device 330.

If not, the RIP 305 will determine if the PDS's 310 destination drive letter designation, e.g. "drive D" is to a remote, shared storage device, such as storage device 340 of FIG. 3. If so, the RIP 305 will transmit the raster image data to the remote storage device 340 over the Ethernet network 325. The transmitted raster image data will be written to the remote storage device 340 using the mapped RIP 305 designation, e.g. "drive G" for remote storage device 340, by remote file access.

If the PDS's 310 destination drive letter designation is not to a remote, shared storage device, e.g. storage device 345, the RIP 305 will transmit the raster image data to the PDS 310 over the SAN 335. The transmitted raster image data will be written to the identified storage device 345 by the PDS 310 using remote file access.

Pseudo code for implementing the above follows:
1) RIP→PDS: Query, where should data be written?*
2) PDS→RIP: Response, X:\path\ . . . \filename*
3) RIP Processing if RIP and PDS are on different workstations:
   a) RIP→PDS: Query, what is the volume ID?*
   b) PDS→RIP: Response, disk device volume ID*
   c) Y=GetLocalDriveID(volume ID)
   d) if Y is an accessible SAN drive write image data to SAN**
   e) else if Y is a remote mapped drive write image data via remote file system**
   f) else write image data via PDS interface**
4) else RIP Processing if RIP and PDS are on same workstation:
   a) Write image data to local drive
5) RIP→PDS: Data has been written*
   where *=Ethernet transfers.
   where **=high speed SAN transfers.

In FIG. 3, the RIPs 305 and PDS 310 have direct connections via the SAN 335. The RIPs 305 and PDS 310 use the Ethernet network link 325 to exchange protocol messages. The raster image data is preferably transmitted via the very high speed SAN link 335a and 335b. The SAN links 335a and 335b can provide 10 times the transfer speed, and allow the Ethernet bandwidth to be utilized for transmission of other than the raster image data, such as for output of the PDS 310.

It should be understood that, if desired, other RIPs 305 could be included in the networked system 300 of FIG. 3, which are not interconnected by the SAN 335. Such RIPs 305 would accordingly transmit raster image data and other data, e.g. messages to the PDS 310, via the Ethernet network 325. However, the transmission of raster image data by these RIPs 305 would take at least 10 times longer over the Ethernet network 325 than transmissions of raster image data by the other RIPs 305 over the SAN 335. This could result in the Ethernet network 325 being saturated during the transfer of the raster image data by these non-SAN RIPs 305, and hence, other PDS 310 operations, requiring Ethernet network 325 transfers, could be adversely impacted.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. An imaging system, comprising:
an image processor configured to generate image data representing an image;
a storage device configured to store the image data;
a print driver configured to generate instructions corresponding to the image data;
an image maker configured to generate a representation of the image in accordance with the print driver instructions;
a first communications network interconnecting the image processor and the print driver; and
a second communications network, different than the first communications network, interconnecting the image processor, the print driver, and the storage device,
wherein the print driver is further configured to transmit to the image processor, via the first communications network, a product identifier for a destination storage device at which the image data generated by the image processor is to be stored;
the image processor is further configured to process the transmitted product identifier to determine if the destination storage device at which the generated image data is to be stored is the storage device; and
the image data generated by the image processor is written to the storage device via the second communications network if the destination storage device at which the generated image data is to be stored is determined to be the storage device.

2. A system according to claim 1, wherein:
the image processor is further configured to write the generated image data to the storage device via the second communications network; and
the print driver is further configured to read the stored image data from the storage device via the second communications network.

3. A system according to claim 2, wherein:
the image processor is further configured to generate a message indicative of the image data having been written to the storage device and to transmit the message to the print driver via the first communications network.

4. A system according to claim 1, wherein:
the image processor is a raster image processor;
the storage device is part of a single pool of storage devices;
the image maker is one of a color proofer and an image setter; and
the second communications network includes respective dedicated links between the image processor and the pool of storage devices, and between the print driver and the pool of storage devices.

5. A system according to claim 4, wherein:
the first communications network includes links having a first bandwidth;
the dedicated links have a second bandwidth greater than the first bandwidth.

6. A system according to claim 1, wherein:
the print driver is further configured to transmit to the image processor, via the first communications network, a destination identifier for the destination storage device at which the image data generated by the image processor is to be stored;
the image processor is further configured to transmit to the print driver, responsive to the transmitted storage device destination identifier and via the first communications network, a request for the product identifier for the destination storage device at the identified destination; and
the print driver is further configured to transmit the product identifier for the destination storage device at the identified destination responsive to the transmitted request.

7. A system according to claim 1, further comprising:
a remote storage device configured to store the image data;
wherein the first communications network is further configured to interconnect the image processor, the print driver and the remote storage device;
wherein the print driver is further configured to transmit to the image processor, via the first communications network, a product identifier for a destination storage device at which the image data generated by the image processor is to be stored;
wherein the image processor is further configured to process the transmitted product identifier to determine if the destination storage device at which the generated image data is to be stored is the remote storage device; and
wherein the image data generated by the image processor is written to the remote storage device via the first communications network if the destination storage device at which the generated image data is to be stored is determined to be the remote storage device.

8. A system according to claim 7, wherein:
the print driver is further configured to transmit to the image processor, via the first communications network, a destination identifier for the destination storage device at which the image data generated by the image processor is to be stored;
the image processor is further configured to transmit to the print driver, responsive to the transmitted destination storage device destination identifier and via the first communications network, a request for the product identifier for the destination storage device at the identified destination; and
the print driver is further configured to transmit the product identifier for the destination storage device at the identified destination responsive to the transmitted request.

9. A system according to claim 8, wherein:
the transmitted storage device destination identifier includes a destination storage device designation for the destination storage device at the identified destination associated with the print driver;
the image processor is further configured to determine if the destination storage device designation associated with the print driver corresponds to a storage device designation for the remote storage device associated with the image processor;
the image data generated by the image processor is written by the image processor directly to the remote storage device via the first communications network, if the storage device designation associated with the print driver is determined to correspond to the storage device designation associated with the image processor for the remote storage device; and
the image data generated by the image processor is transmitted by the image processor to the print driver via the second communications network, if the storage device designation associated with the print driver is not determined to correspond to the storage device designation associated with the image processor for the remote storage device.

10. A method for generating a representation of an image, comprising:
generating image data representing an image;
writing the generated image data to a storage device via a first communications network;
transmitting a notice of the generated image data having been written to the storage device via a second communications network, different than the first communications network;
reading the stored image data from the storage device via the first communications network;
generating instructions corresponding to the read image data;
generating a representation of the image in accordance with the instructions;
transmitting, via the second communications network, a product identifier for a destination storage device at which the image data is to be stored; and
processing the transmitted product identifier to determine if the destination storage device, at which the generated image data is to be stored, is located on the first communications network;
wherein the generated image data is written to the storage device via the first communications network only if the destination storage device, at which the generated image data is to be stored, is determined to be located on the first communications network.

11. A method according to claim 10, wherein:
the generated image data is generated raster image data;
the generated image representation is one of a color proof of the image and the image;
the generated raster image data is written to the storage device via a first dedicated communications link within the first communications network; and
the stored raster image data is read from the storage device via a second dedicated communications link within the first communications network.

12. A method according to claim 11, wherein:
the dedicated links have a first bandwidth; and
links within the second communications network have a second bandwidth, less than the first bandwidth.

13. A method according to claim 10, further comprising:
transmitting, via the second communications network, a destination identifier for the destination storage device at which the generated image data is to be stored;
transmitting, responsive to the transmitted destination storage device destination identifier and via the first communications network, a request for the product identifier for the destination storage device at the identified destination; and
transmitting the product identifier for the destination storage device at the identified destination responsive to the transmitted request.

14. A method according to claim 10, further comprising:
generating other image data representing an image;
transmitting, via the second communications network, a product identifier for a destination storage device at which the other generated image data is to be stored;
processing the transmitted product identifier to determine if the destination storage device at which the other generated image data is to be stored is remote to the first communications network; and
writing the other generated image data to a remote storage device identified by the product identifier via the second communications network if the destination storage device identified by the product identifier is determined to be remote to the first communications network.

15. A method according to claim 14, further comprising:
transmitting, via the second communications network, a destination identifier for the destination storage device at which the other generated image data is to be stored;
transmitting, responsive to the transmitted destination storage device destination identifier and via the second communications network, a request for the product identifier for the destination storage device at the identified destination; and
transmitting the product identifier for the destination storage device at the identified destination responsive to the transmitted request.

16. A method according to claim 15, wherein the transmitted destination storage device destination identifier includes a first storage device designation for the destination storage device at the identified destination, and further comprising:
determining if the first storage device designation corresponds to a second storage device designation for the remote storage device;
wherein the other generated image data is written directly to the remote storage device via the second communications network, if the first storage device designation is determined to correspond to the second storage device designation; and
wherein the other generated image data is transmitted to a network device other than the remote storage device via the first communications network, if the first storage device designation is not determined to correspond to the second storage device designation.

* * * * *